US012556879B2

(12) United States Patent

Messingher Lang et al.

(10) Patent No.: US 12,556,879 B2
(45) Date of Patent: Feb. 17, 2026

(54) SHARED POINT OF VIEW

(71) Applicant: Apple Inc., Cupertino, CA (US)

(72) Inventors: Shai Messingher Lang, Santa Clara, CA (US); Jonathan D. Sheaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 18/103,396

(22) Filed: Jan. 30, 2023

(65) Prior Publication Data

US 2024/0098447 A1 Mar. 21, 2024

Related U.S. Application Data

(63) Continuation of application No. PCT/US2021/041847, filed on Jul. 15, 2021.

(60) Provisional application No. 63/059,660, filed on Jul. 31, 2020.

(51) Int. Cl.
*H04S 7/00* (2006.01)
*H04R 1/10* (2006.01)

(52) U.S. Cl.
CPC ............... *H04S 7/304* (2013.01); *H04R 1/10* (2013.01); *H04R 2499/15* (2013.01)

(58) Field of Classification Search
CPC ........ H04S 7/304; H04R 1/10; H04R 2499/15
See application file for complete search history.

(56) References Cited

U.S. PATENT DOCUMENTS

| | | | | |
|---|---|---|---|---|
| 10,225,656 | B1 | 3/2019 | Kratz et al. | |
| 2009/0262946 | A1* | 10/2009 | Dunko | G06F 3/165 381/17 |
| 2014/0300636 | A1* | 10/2014 | Miyazaya | H04R 5/033 345/633 |
| 2017/0325045 | A1 | 11/2017 | Baek et al. | |
| 2017/0359467 | A1* | 12/2017 | Norris | G10L 21/028 |
| 2019/0116448 | A1 | 4/2019 | Schmidt et al. | |
| 2019/0208345 | A1* | 7/2019 | Mindlin | H04R 5/04 |
| 2019/0387350 | A1 | 12/2019 | Audfray et al. | |
| 2021/0035597 | A1* | 2/2021 | Eubank | H04S 7/304 |
| 2021/0092545 | A1* | 3/2021 | Leppänen | H04S 7/40 |
| 2021/0176588 | A1* | 6/2021 | Audfray | H04S 7/306 |
| 2022/0059123 | A1 | 2/2022 | Sheaffer et al. | |

FOREIGN PATENT DOCUMENTS

| | | |
|---|---|---|
| EP | 2282556 | 2/2011 |
| WO | 2016014254 | 1/2016 |

OTHER PUBLICATIONS

International Search Report and Written Opinion for International Application No. PCT/US2021/041847 mailed Nov. 12, 2021, 14 pages.

* cited by examiner

*Primary Examiner* — Daniel R Sellers
(74) *Attorney, Agent, or Firm* — Aikin & Gallant, LLP

(57) ABSTRACT

Sound sources can be spatially rendered in a setting and shown through a display. In response to satisfaction of a threshold criterion that is satisfied based on relative distance between the sound sources and a position of a listener, the rendering of the sound sources can be adjusted to maintain spatial integrity of the sound sources. The adjustment can be performed to prevent one of the sound sources from arriving at the listener earlier than another of the sound sources.

24 Claims, 7 Drawing Sheets

SHARED POINT OF VIEW

CROSS REFERENCE

This application is a continuation of International Application No. PCT/US2021/041847 filed Jul. 15, 2021, which claims the benefit of the U.S. Provisional application Ser. 63/059,660 filed Jul. 31, 2020.

FIELD

One aspect of the disclosure herein relates to audio processing with a shared point of view.

BACKGROUND 3D audio rendering can be described as the processing of an audio signal (such as a microphone signal or other recorded or synthesized audio content) so as to yield sound produced by a multi-channel speaker setup, e.g., stereo speakers, surround-sound loudspeakers, speaker arrays, or headphones. Sound produced by the speakers can be perceived by the listener as coming from a particular direction or all around the listener in three-dimensional space. For example, one or more of such virtual sound sources can be generated in a sound program that will be perceived by a listener to be emanating from some direction and distance relative to the listener.

A user may wish to share the user's experience (e.g., a mountain view, a birthday celebration, etc.) with a second user located elsewhere. The user can operate a capture device having a microphone and a camera to capture audio and visual data, and stream this data to the second user. Processing of this audio and visual data can enhance the second user's playback experience.

SUMMARY

Audio signals can be captured by a microphone array in a physical setting. A physical setting refers to a world that individuals can sense and/or with which individuals can interact with human senses, e.g., without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste. The terms 'setting' and 'environment' are used herein interchangeably.

Virtual sound sources can be generated in an extended reality environment. Various examples of electronic systems and techniques for using such systems in relation to various XR technologies are described.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

In some aspects, a method is described that includes spatially rendering a first sound source to be perceived by a listener at a first position relative to a virtual listener position in a setting (e.g., an XR environment). The setting is shown through a display to the listener. A second sound source is spatially rendered to be perceived at a second position relative to the virtual listener position in the setting. The first sound source and the second sound source are spatially rendered to audio signals that are played back to the listener through speakers.

In response to satisfaction of a threshold criterion that includes at least one of: a) a distance between the virtual listener position and the first position, b) a distance between the virtual listener position and the second position, and c) a difference of the distance between the virtual listener position and the second position and the distance between the virtual listener position and the first position, a remedial operation can be performed to preserve the perceived spatial integrity of the playback audio.

In some aspects, the remedial operation includes adjusting spatial filters applied to the first sound source so that the first sound source is to be perceived by the listener at a third position relative to the virtual listener position that is closer to the virtual listener position than the first position. In some aspects, the remedial operation includes applying spatial filters to the second sound source so that the second sound source is to be perceived by the listener to remain at a threshold distance from the virtual listener position regardless of if the listener becomes closer to a virtual representation of the second sound source. In some aspects, the remedial operation includes moving the first sound source or the second sound source in the setting such that the threshold criterion is no longer satisfied, or preventing a change to the virtual listener position if the change would result in the threshold criterion being satisfied. In some aspects, the remedial operation includes applying a delay to the second sound source if the delay does not satisfy a delay threshold.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
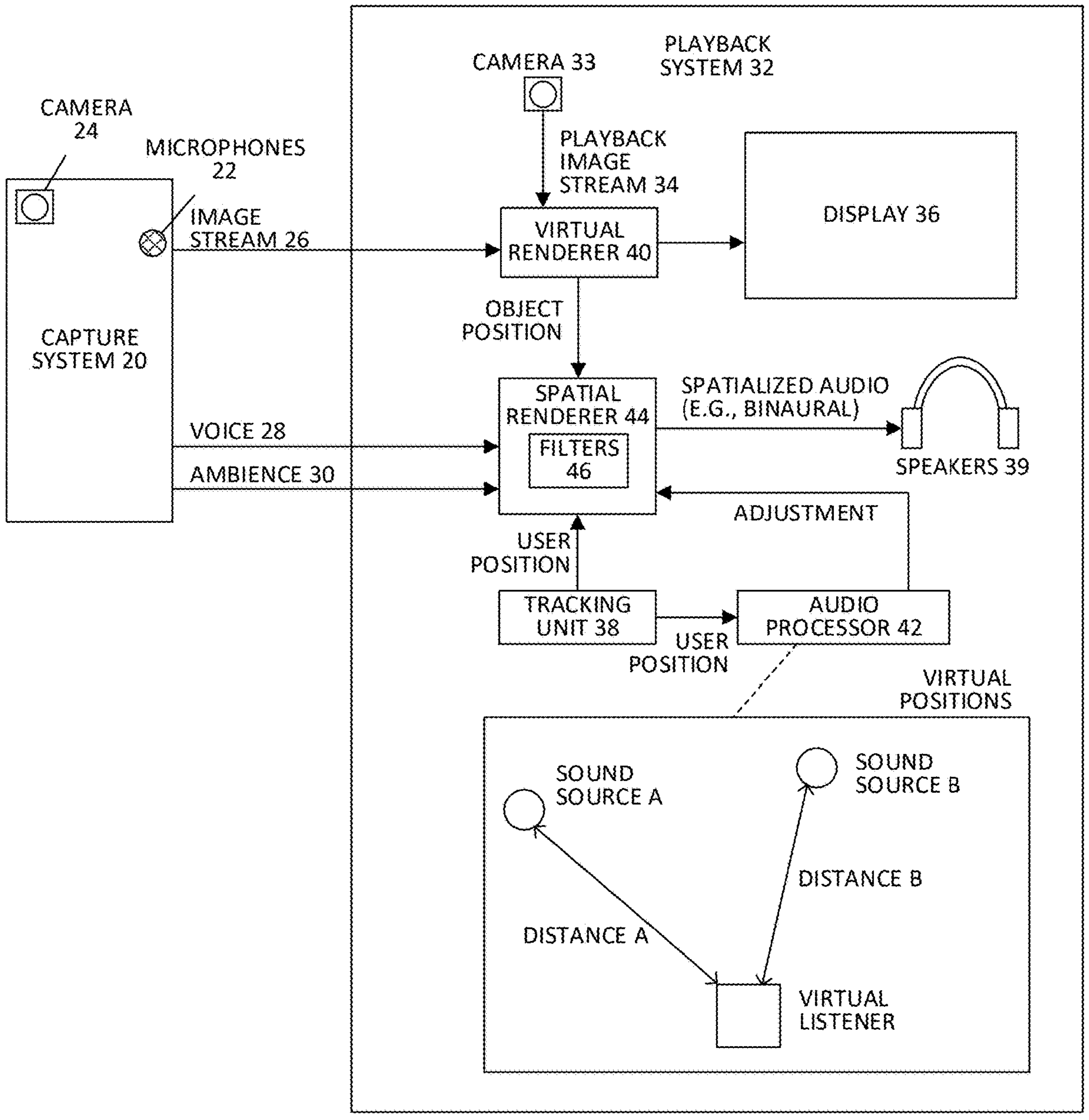
FIG. 1 shows a system for sharing and playback of audio and video data, according to some aspects.

FIG. 1 shows a system for sharing and playback of audio and video data, according to some aspects. A capture system 20 has a one or more microphones 22. The one or more microphones can form one or more microphone arrays having fixed and known positions. The microphones sense a sound field in the surrounding environment. The capture system can include analog to digital converters to digitize the microphone signals.

The microphone signals can be processed to extract a voice signal 28. For example, a dereverberator, a denoiser (e.g., a parametric multi-channel Wiener filter), a multi-channel linear prediction module, or combinations thereof can be applied to the microphone signals to extract a voice signal. Additionally or alternatively, beamforming can be applied to the microphone signals to tune one or more pick up beams at the voice in the sound field, to extract the voice signal.

Similarly, the microphone signals can be processed to extract an ambience signal 30. For example, the extracted voice can be subtracted from one or more of the microphone signals, or an average of the microphone signals, or a beam formed pickup of the microphone signals, resulting in a signal the ambience signal 30. Ambience here refers to sounds picked up in the environment other than the voice in voice signal 28. Other voice and ambience extraction techniques can be implemented, however, details of which are not germane to the present disclosure.

Although the voice signal 28 contains predominantly voice, the voice signal can include some residual amount of ambience, due to some error or loss in the voice extraction algorithm. Similarly, the ambience signal contains predominantly ambience, but can include some residual amount of voice. These trace residuals of voice and ambience can negatively impact spatial reproduction of these signals during playback unless somehow mitigated, as described in the present disclosure.

The capture system can include a camera 24 that can generate an image stream 26 that captures the visual environment around the camera. The image stream, the voice, and the ambience signals can be synchronized (e.g., through timestamping, shared frames, etc.) such that the playback system 32 can play the audio and the video together in synchronization.

The playback system 32 can include a camera 33 that captures a second image stream of the visual environment around the playback system. This can be a different environment than that of the capture system. For example, the capture system may capture a scene of a child's birthday party. Meanwhile, the playback system might be located in a location different from the capture system. The virtual renderer can render one or more virtual objects integrated with the image stream 34, resulting in an XR scene. This XR scene can be shown to a display 36.

The display can be integral to a television, a computer monitor, a tablet computer, a smart phone, a head mounted display (HMD), or an XR device. In some aspects, the display can be a see-through glass. In such a case, the virtual objects can be projected onto the glass and into the eye with known techniques, and naturally integrated with the environment surrounding the playback device that is visible through the glass and camera 33 may not be necessary.

In some aspects, at least one of the virtual objects shown to the display is a window (e.g., a virtual display) that shows the image stream 26. In such a case, the display 36 will show the environment of the playback system 32 as well as the environment of the capture device, thus allowing the user at the playback system to view both environments simultaneously. Additionally, or alternatively, the virtual objects can include an avatar (e.g., a computer generated character) that represents a speaker, which can be an operator of the capture device. The voice signal 28 can be associated with the avatar and the ambience signal 30 can be associated with the virtual display. In such a manner, a user operating the capture device can share her experience with a camera while narrating. The user at the playback device can see and follow the experience through the video in the window, and narration of the capturer contained in the voice signal.

Each of these virtual objects can have a virtual position in virtual space that corresponds to how the virtual object is rendered over the image stream. Some or all of the virtual objects can be sound sources. The virtual objects can be associated with one or more sound sources (e.g., an audio signal, a sound object in an object-based sound format, a channel, a digital asset, etc.). Positions of each respective sound source can be the same as the virtual position of each of the virtual objects. For example, a virtual ball bouncing on the floor can cause a 'bounce' sound. Further, a sound signal (e.g., a bounce sound) can be rendered spatially by spatial renderer 44 such that the bounce is perceived, by a listener, to emanate from the location at which the ball bounce is shown, visually, in the display 36. As described, however, the spatially rendered sound position and the visual position of the virtual objects can be decoupled due to mitigation efforts to preserve spatial integrity in some aspects.

Spatial renderer 44 can apply filters 46 to one or more sound sources (e.g., voice and ambience), to spatially render the sound sources in output channels that drive speakers 39. The filters 46 can be selected and adjusted based on a tracked user position and a virtual position of the virtual object (e.g., the avatar). In some aspects, the voice signal can be used as a sound source that is associated with one of the virtual objects. In some aspects, the voice signal is associated with an avatar (a virtual object representing a person) that is rendered in over the image stream.

Tracking unit 38 can determine user position based on one or more sensors such as, for example, a gyroscope, an accelerometer, an inertial measurement unit (IMU), cameras, or microphones, or other sensors. In some aspects, the tracking unit can be integral to a mobile device such as, for example, a tablet computer or a smart phone, smart speakers, a headphone set, a head mounted display, or other electronic device. The tracking unit can apply known tracking algorithms (e.g., an IMU tracking algorithm, inside-out tracking, etc.) to the sensor data to track a position of a device or user such as a user who is holding or wearing the device.

Based on the user position (e.g., determined by the tracking unit) and the virtual position of the virtual object (e.g., provided by the renderer 40), the spatial renderer 44 can select filters (that include delay and gain values for different frequency bands) that represent a head related transfer function (HRTF). The filters are applied to the voice signal, ambience signal, or other audio signals, to impart spatial cues in the signal so that the audio associated with the virtual object is perceived to emanate from the virtual position. The spatialized audio signals are perceived to have a direction and distance from the user that is in accord with or matches with the where the associated audio objects are shown in space relative to the user through the display. The spatial renderer can also control loudness of each sound source (e.g., individually). Loudness of a sound source can be increased by the spatial renderer as a function of distance from the sound source, e.g., as the listener moves closer to the sound source in the setting, the loudness is increased, and as the listener moves away from the sound source, the loudness decreases.

The HRTF, when applied to the signals, can generate a left and right spatialized audio signal (e.g., voice signal, ambience signal, etc.). These signals can be combined (e.g., added together) to form a spatialized audio in a select format (e.g., binaural audio including a left audio channel and right audio channel) for playback through speakers 39. Such speakers can be ear-worn speakers (e.g., on-ear, over-ear, in-ear), standalone speakers, or speakers integrated with another electronic device (e.g., a computer, a tablet computer, a smart phone).

Since voice and ambience separation algorithms might not work perfectly, trace amounts of the capturing user's voice might be contained in the ambience signal. Similarly, trace ambience might be contained in the voice signal. According to the law of first wavefront, the first audio wavefront to reach a listener's ear can determine a direction of a sound.

For example, spatial integrity can be negatively impacted when the receiving user is closer in space to the ambience sound source than the voice sound source, because if the user is closer to the ambience sound source, and the ambience sound source also contains trace amounts of voice, and the spatial renderer renders the ambience sound source so that it is heard to 'arrive' at the listener before the voice signal, then listener may perceive that the direction of the voice emanates from the ambience sound source instead of the voice sound source. A similar problem may arise with the ambience signal if the user is closer in space to the voice sound source than the ambience sound source.

The audio processor 42, can compare relative distances between the audio sources and the user position, and make adjustments to the spatial rendering to avoid compromising the spatial integrity of the sound scene. These adjustments which are mitigation efforts can prevent a first sound source from being heard prior to a second sound source, if that first sound source contains trace audio components of the second sound source and/or vice versa.

Figure 2:
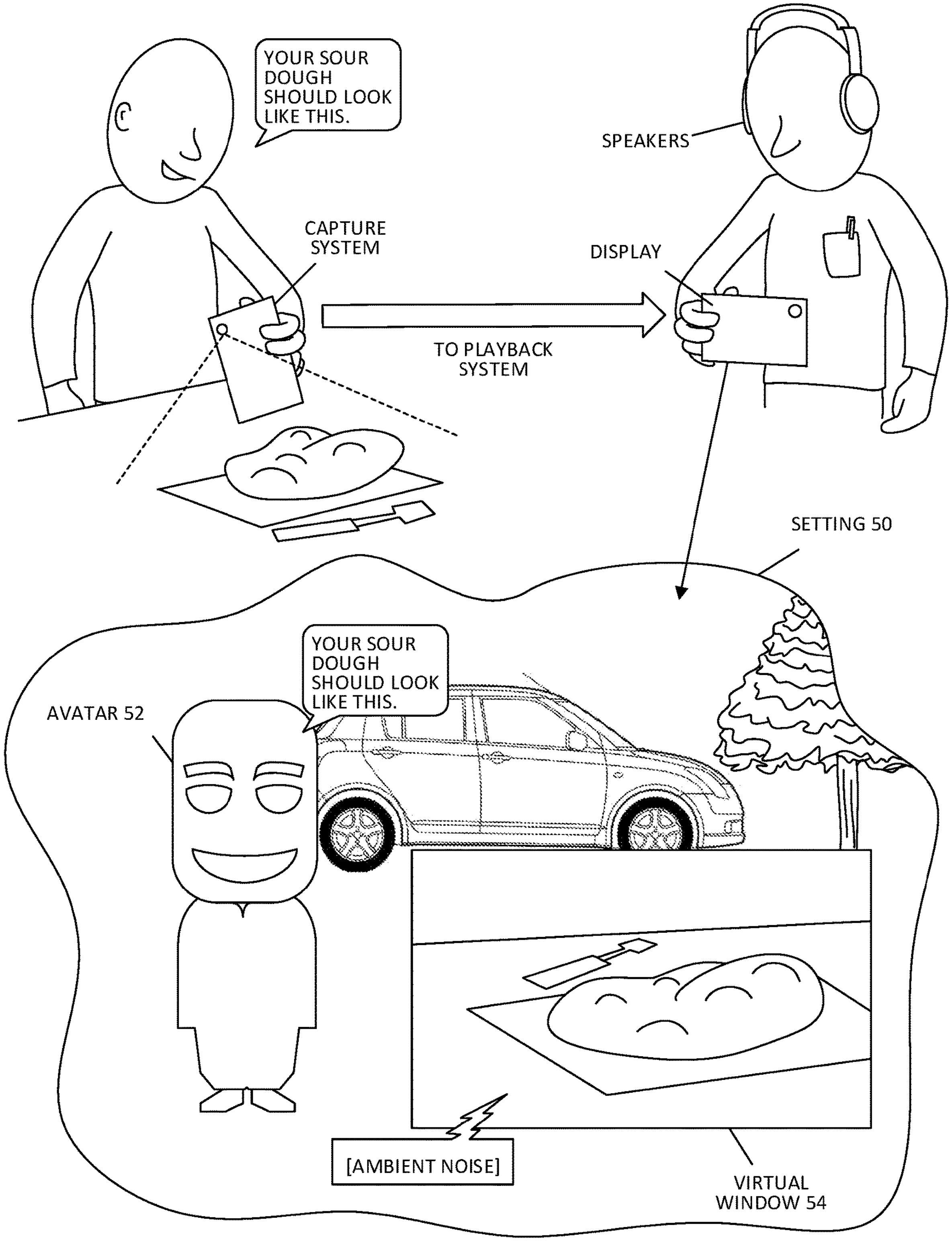
FIG. 2 illustrates an example of sharing and playback of audio and video data, according to some aspects.

FIG. 2 illustrates an example of sharing and playback of audio and video data, according to some aspects. In this illustrated example, a user that operates a capture system to capture audio and visual data. The capturing user records the surrounding environment, e.g., showing the making of sourdough bread in a kitchen, while verbally narrating the various steps of the recipe. This audio and video data can be shared to the playback device as a video stream (a sequence of images), a voice signal, and ambience signal. The voice contains predominantly the capturer's voice. Ambience can include background noise such as music, a fan, running water, or other voices.

A user operating the playback system can hear the voice and ambience through headworn speakers driven by spatially rendered binaural audio signals. In the playback system's display, the ambience can be spatially rendered so that it is perceived to be emanating from a virtual window 54 shown in a setting 50 (e.g., an XR environment). The virtual window can show the video stream (making of sourdough bread) shared to the receiving user by the capturer. Simultaneously, an avatar 52 is graphically rendered to the display, and the voice signal from the capture device is associated with the avatar. The voice sound source is spatially rendered such that it is perceived to be emanating from where the avatar is shown in the display.

The setting 50 can include the environment of the receiving user and virtual objects (e.g., the avatar and the window) that have virtual positions integrated in the setting. As the receiving user physically moves around the environment, a position tracker of the playback system can track position of the user relative to the XR environment, including the virtual objects in the XR environment. Thus, the receiving user may walk towards the virtual window and get close enough to the virtual window (and/or far enough from the avatar) such that the trace amounts of voice that are in the ambience would be played to the user prior to voice from the voice sound source (e.g., the avatar). As described, due to the law of first wavefront, this can compromise the spatial integrity of the sound scene because the listener may perceive the voice to be coming from the virtual window instead of from the avatar. Mitigation efforts can be implemented when threshold criterion are satisfied, where these criterion (or criteria) indicate that the perceived spatial integrity of the sound scene is at risk of being compromised.

Figure 3:
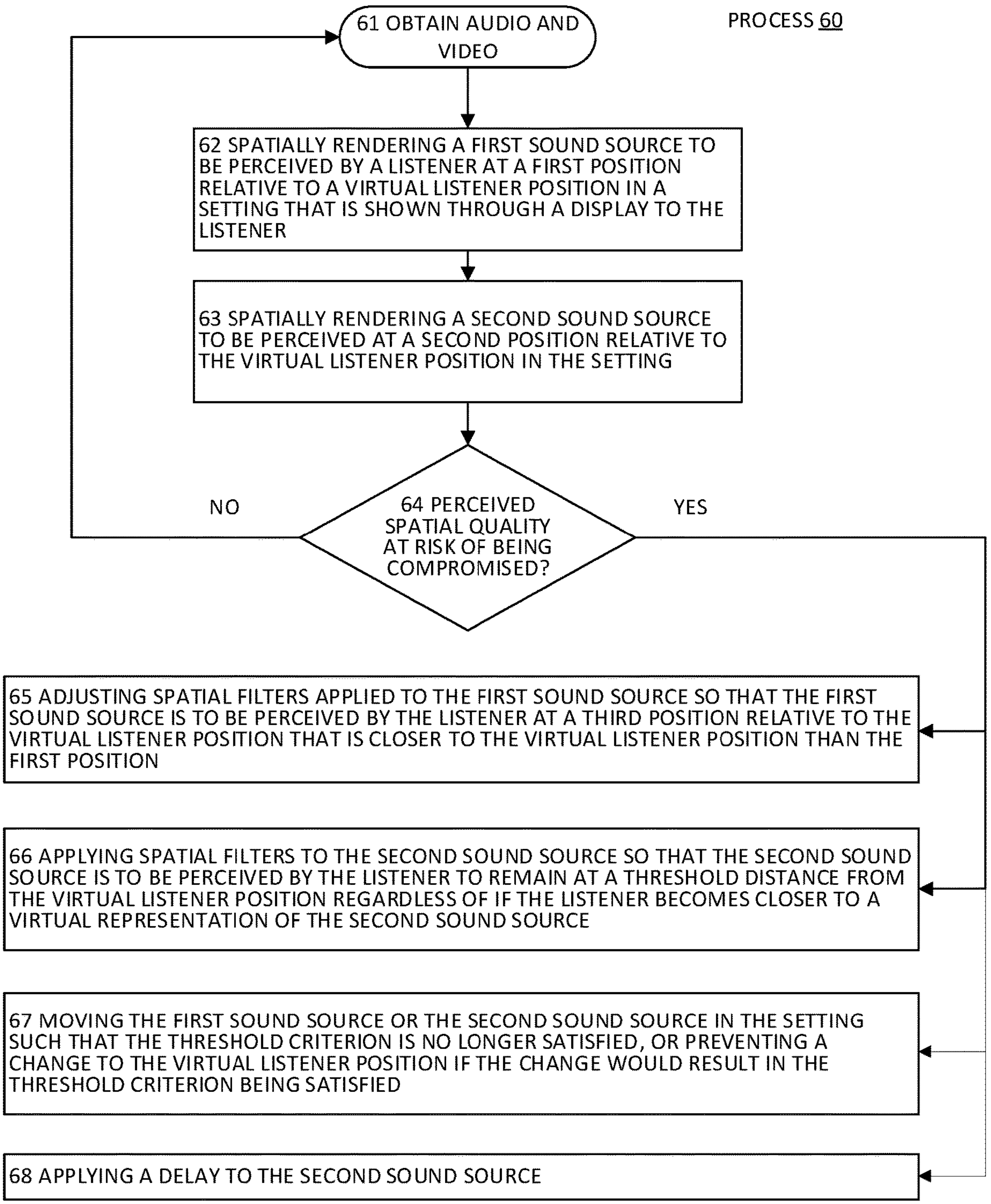
FIG. 3 shows a process for sharing and playback of audio and video data, according to some aspects.

FIG. 3 shows a process for sharing and playback of audio and video data, according to some aspects. The process can be performed by a playback system such as those shown and described with respect to FIG. 1 and FIG. 2. At operation 61, the process includes obtaining audio and video, such as a first audio signal, a second audio signal, and a video stream. The first audio signal can have trace amounts of audio contained in the second audio signal. Similarly, the second audio signal can have trace amounts of audio contained in the first audio signal. The first audio signal can represent a first sound source, and the second audio signal can represent a second sound source.

At operation 62, the process includes spatially rendering a first sound source to be perceived by a listener at a first position relative to a virtual listener position in a setting that is shown through a display to the listener. The setting can be an XR setting containing visual imagery of the environment of the playback system. Virtual objects can be rendered, visually in the setting, at a position that coincides with the first position of the first sound source. As discussed, spatial rendering can be performed by applying spatial filters representing an HRTF. The filters can be determined based on a tracked listener position and the position (e.g., the first position) of the first sound source. For example, if the listener moves closer or to the side of the first sound source, then the filters are updated so that, when applied, the first sound source is perceived to sound closer or to the side of the listener.

At operation 63, the process includes spatially rendering a second sound source to be perceived at a second position relative to the virtual listener position in the setting. The first sound source can be a voice signal (e.g., containing predominantly voice of a user operating a capture device, such as, for example, greater than 95%) and the second sound source can be ambience (containing predominantly ambience, such as, for example, greater than 95%) captured by the capture device. In other aspects, both sound sources can be voice or both sound sources can be ambience. In some aspects, the sound sources can be other sound sources, for example, music, sound effects, animal sounds, machinery, etc. Further, it should be understood that the first sound source and second sound source are interchangeable for the purpose of the present disclosure and aspects that apply to the first sound source can be applied to the second sound source and vice versa.

At operation 64, the process determines whether the perceived spatial quality of the scene is at risk of being compromised, e.g., due to the law of first wavefront. This determination can be made based on one or more threshold criterion. In some aspects, the threshold criterion includes a distance between the virtual listener position and the position of the first sound source (the first position). In some aspects, the threshold criterion includes a distance between the virtual listener position and the position of the second sound source (the second position).

In some aspects, the threshold criterion includes a difference of a) the distance between the virtual listener position and the second position, and b) the distance between the virtual listener position and the first position. In some aspects, the difference can be calculated through subtraction, e.g., D2−D1, where D1 is the distance between the first sound source position and the listener and D2 is the distance between the second sound source and the listener. As D2 becomes smaller, or D1 grows greater, the closer the threshold becomes to being satisfied.

For example, as the listener moves closer to the second sound source, the second sound source will arrive at the listener earlier. If the first sound source is relatively close to the listener, then this would not be a problem, because the first sound source would still arrive at the listener first. Further, as discussed, the first sound source would be rendered to be relatively louder and drown out trace amounts of components of the first sound source that are in the second sound source. If, however, the first sound source is relatively farther away from the listener than the second sound source, then the second sound source will arrive at the listener first, which could compromise the spatial integrity of the audio scene. Further, the loudness of the second sound source will be greater as the distance between the listener and the second sound source is reduced. Thus, the components of the first sound source in the second sound source will become more audible, and increase the risk of compromising the spatial integrity of the audio scene. If the threshold criterion is satisfied, (e.g., D2-D1 falls below a threshold value), then a mitigation operation is performed.

In some aspects, the threshold criterion includes an amount of residual of the first sound source contained in the second sound source, an amount of residual of the second sound source contained in the first sound source, and/or a loudness of the first sound source or the second sound. The greater the residual amount in the respective sound source, or the greater the loudness of that sound source, the more offending that sound source is, and the higher the risk is that the spatial integrity will be compromised. For example, if the second sound source contains ambience with low trace amount of voice, then even as the listener approaches this second sound source, the trace amount of voice may not be audible to the listener, or not audible enough to disturb the spatial integrity of the sound scene. Similarly, if the second sound source has a low loudness, then the trace amount of voice may not be audible, or not audible enough to disturb the spatial integrity of the sound scene.

In some aspects, the threshold criterion includes a combination of the criterion described, such that the threshold is satisfied when a secondary sound source containing audible trace amounts of a primary sound source becomes close enough to a listener that it would arrive at the listener first, and this trace amount is perceptible (e.g., loud enough and/or meets a threshold residual amount) by the listener. For example, the threshold criterion can be satisfied based on a formula that includes a difference between the first sound source and the listener and the second sound source and the listener, as well as an amount of residual of the first sound source in the second sound source (or vice versa), and/or a loudness of the first sound source in the second sound source (or vice versa). Other combinations can be determined, based on routine test, experimentation, and tailored based on application.

If, at operation 64, it is determined that the spatial quality of the sound scene is at risk of being compromised (e.g., the threshold criterion is satisfied), then the process can transition to a mitigation operation such as operation 65, operation 66, operation 67, or operation 68. It is contemplated that each mitigation operation may have one or more advantages or disadvantages compared to another of the mitigation operations, thus one may be more suitable under some circumstances than another.

At operation 65, the process includes adjusting spatial filters applied to the first sound source so that the first sound source is to be perceived by the listener at a third position relative to the virtual listener position that is closer to the virtual listener position than the first position.

Figure 4:
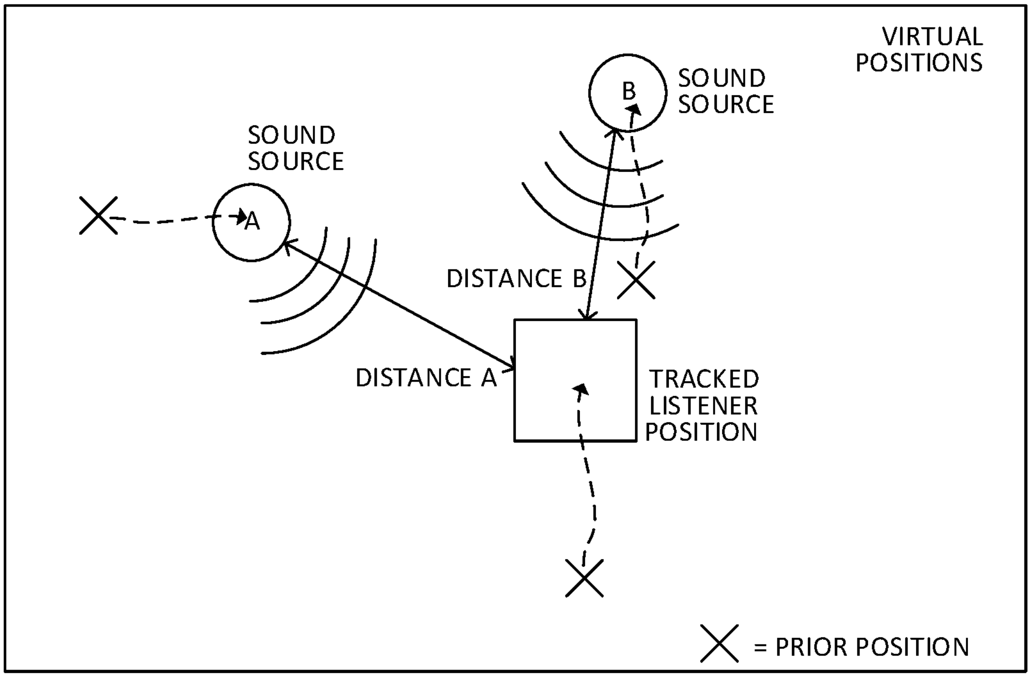
FIG. 4 shows examples of preserving spatial acoustics by moving sound sources, according to some aspects.

For example, FIG. 4 shows a virtual position of a listener that moves closer to a sound source B. When the threshold criterion is satisfied, e.g., distance B—distance A is less than a threshold distance, and/or the other threshold criterion are satisfied, then sound source A is moved closer to the listener so that it arrives sooner at the listener than sound source B. A virtual object associated with sound source A (e.g., an avatar) can optionally be moved proportionally towards the listener so that the sound source spatially accords with the visual representation of the sound source. In such a manner, the first sound source is brought closer to the listener so that the first sound source arrives at the listener before the second sound source, thus preventing the law of first wavefront from compromising the spatial integrity of the sound scene.

At operation 66 of FIG. 3, the process includes applying spatial filters to the second sound source so that the second sound source is to be perceived by the listener to remain at a threshold distance from the virtual listener position regardless of if the listener becomes closer to a virtual representation of the second sound source. In other words, even if the listener moves closer to a virtual representation of the sound source (e.g., a window showing a video stream captured and shared from another device), the second sound source will be spatially rendered at some threshold distance, e.g., far enough away from the listener such that the second sound source does not arrive at the listener prior to the first sound source. Under this mitigation operation, there could be some slight discord and decoupling between the position of the visual representation of the second sound source and the position of the second sound source as spatially rendered and heard.

Figure 5:
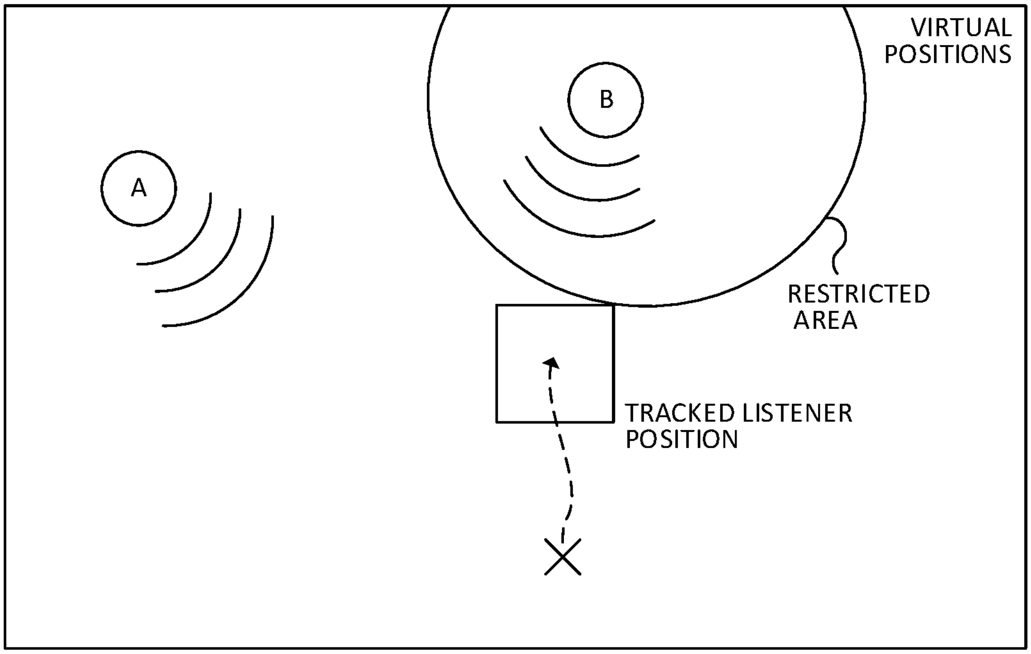
FIG. 5 shows an example of preserving spatial acoustics integrity by restricting listener position, according to some aspects.

At operation 67, the process includes moving the first sound source or the second sound source in the setting such that the threshold criterion is no longer satisfied, or preventing a change to the virtual listener position if the change would result in the threshold criterion being satisfied. For example, in FIG. 5, a restricted area is shown as an example of where the threshold criterion would be satisfied if the listener moved within the area. Thus, the tracking system can restrict movement of the user from moving within the restricted area, or move sound source B away from the listener such that the listener does not enter the restricted area.

Figure 6:
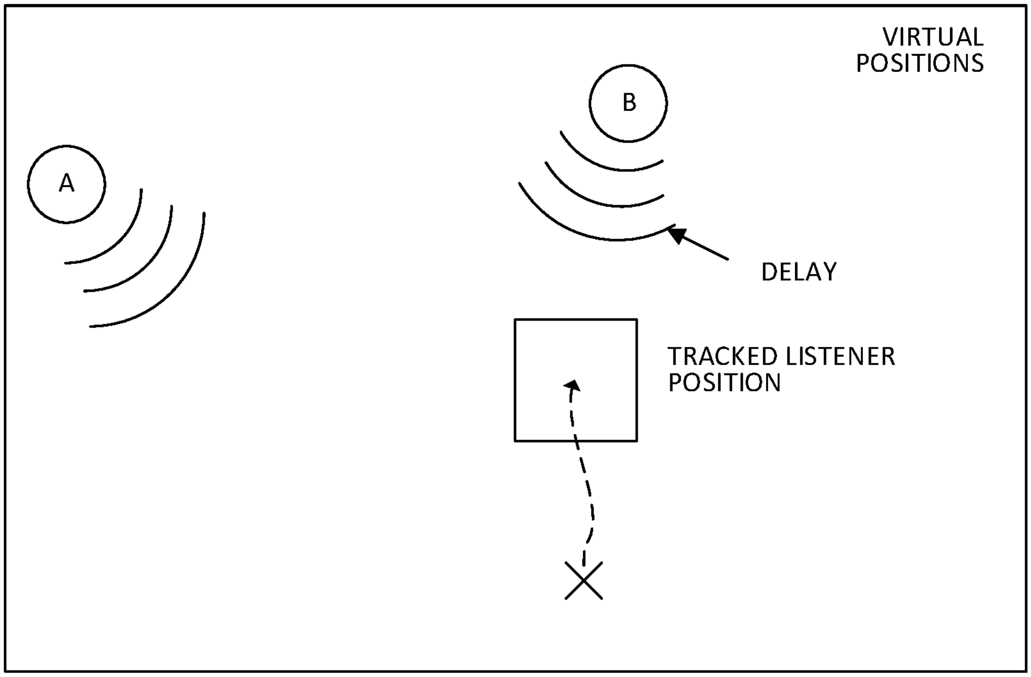
FIG. 6 shows an example of preserving spatial acoustics by applying a delay, according to some aspects.

Referring to FIG. 3, at operation 68, the process includes applying a delay to the second sound source (e.g., as shown in FIG. 6). The delay can be a time delay that is large enough to prevent the second sound source from arriving at the listener prior to the first sound source. Additionally, the delay can be small enough so that it does not create a perceived echo effect, such as, for example, greater than 30 ms, 40 ms, or 50 ms. If the delay is too large, trace amount of sound source A in sound source B may be perceived as an echo of sound source A, which could negatively impact the acoustic experience of the listener.

Figure 7:
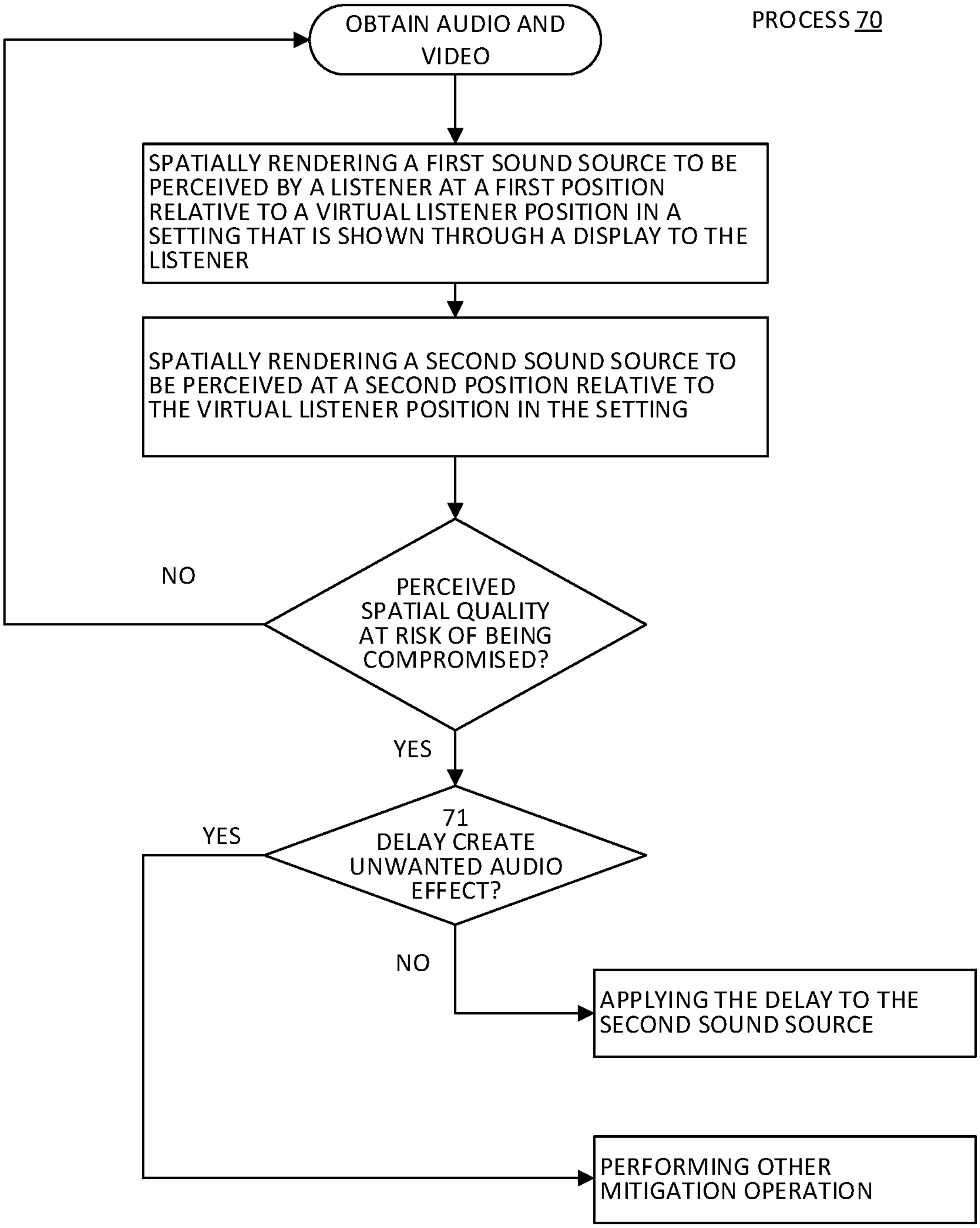
FIG. 7 shows a process for sharing and playback of audio and video data, according to some aspects.

In some aspects, as shown in FIG. 7, the delay is applied as a primary mitigation operation, unless the delay would create an unwanted audio effect. For example, if the spatial quality is at risk of being compromised (as discussed with respect to FIG. 3), the process proceeds to operation 71. At operation 71, if applying the delay, having a time t that is large enough to prevent the second sound source from arriving at the listener prior to the first sound source, would not result in an unwanted audio effect such as a perceived echo, then the delay is applied. If, however, the delay would result in the unwanted audio effect, other mitigation operations can be performed, such as operations 65, 66, and 67 as shown in FIG. 3.

In some aspects, the first sound source is primarily voice, but has trace amount of ambience. In some aspects, the second sound source is primarily ambience, but has trace amount of voice. In some aspects, the first sound source is primarily ambience and the second sound source primarily voice, but the first sound source contains trace amounts of voice and the second sound source contains trace amounts of ambience.

It should be understood that trace or residual amounts can vary based on application, and can mean, for example, 1% or less, 2% or less, 5% or less, or 10% or less. Further, threshold criterion such as distance, differences, ratios, loudness, and trace amounts can vary based on application and can be determined through routine test and experimentation.

In some aspects the display of processes 60 and 70 is integrated in a head worn device that forms a head mounted display, a head up display, or an electronic device as described in other sections. The spatially rendered sound sources (e.g., the first sound source and the second sound source) can be combined in a spatial audio format such as, for example, a binaural audio output having a left channel and a right channel. These audio channels can be used to drive a left and right ear worn speaker of a headset.

It should be understood that the setting can include a plurality of sound sources (and, in some cases, virtual representations of such sound sources shown to the display). The system can monitor each of the sound sources to determine if any pair of sound sources (such as the first sound source and the second sound source) satisfy the threshold criterion. For example, there can be multiple voice sound sources, and some voice sound sources may have residual of other voice sound sources, thus creating a risk to spatial integrity should the residual be heard by a listener earlier than the primary sound source. Similarly, there could be multiple ambience sound sources, and there could be residuals of each other in the ambience sound sources. Similarly, the setting can have multiple voice and multiple ambience sound sources that have residuals of each other. Thus, the system can identify one or more sound sources that satisfy the threshold criterion and apply mitigation operations to the select sound sources.

Figure 8:
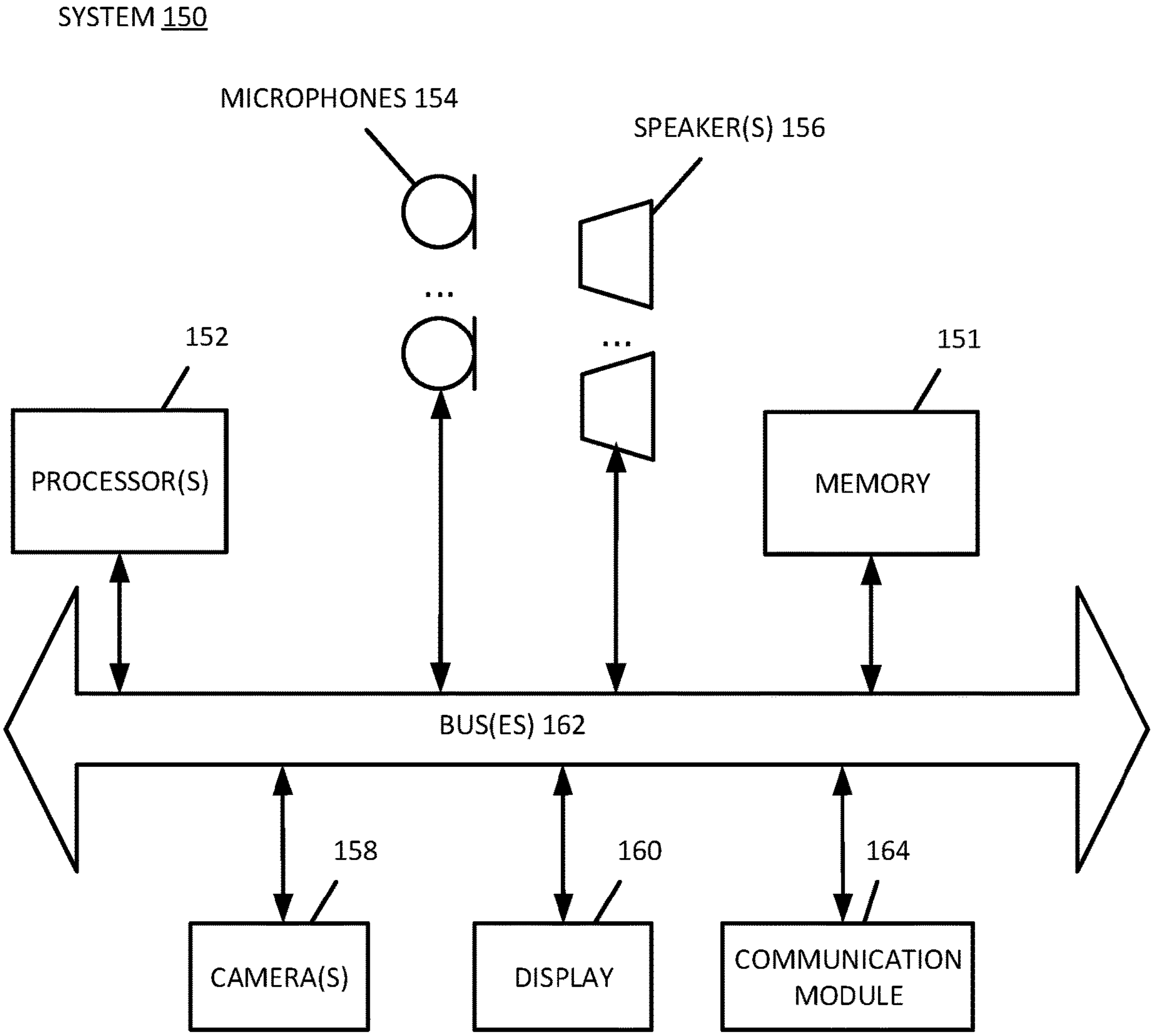
FIG. 8 shows an example audio system, according to some aspects.

FIG. 8 is an example implementation of the audio systems such as the capture device and the playback device described in other sections. Note that although this example shows various components of an audio processing system that may be incorporated into headphones, speaker systems, microphone arrays and entertainment systems, it is merely one example of a particular implementation and is merely to illustrate the types of components that may be present in the audio processing system.

This example is not intended to represent any particular architecture or manner of interconnecting the components as such details are not germane to the aspects herein. It will also be appreciated that other types of audio processing systems that have fewer components than shown or more components than shown in this example audio system can also be used. For example, some operations of the process may be performed by electronic circuitry that is within a headset housing while others are performed by electronic circuitry that is within another device that is communication with the headset housing, e.g., a smartphone, an in-vehicle infotainment system, or a remote server. Accordingly, the processes described herein are not limited to use with the hardware and software shown in this example in FIG. 8.

FIG. 8 is an example implementation of the audio systems and methods described above in connection with other figures of the present disclosure, that have a programmed processor 152. The components shown may be integrated within a housing, such as that of a smart phone, a smart speaker, a tablet computer, a head mounted display, head-worn speakers, or other electronic device described in the present disclosure. These include microphones 154 which may have a fixed geometrical relationship to each other (and are therefore treated as a microphone array.) The audio system 150 can include speakers 156, e.g., ear-worn speakers.

The microphone signals may be provided to the processor 152 and to a memory 151 (for example, solid state non-volatile memory) for storage, in digital, discrete time format, by an audio codec. The processor 152 may also communicate with external devices via a communication module 164, for example, to communicate over the internet. The processor 152 can be a single processor or a plurality of processors.

The memory 151 has stored therein instructions that when executed by the processor 152 perform the processes described herein the present disclosure. Note that some of these circuit components, and their associated digital signal processes, may be alternatively implemented by hardwired logic circuits (for example, dedicated digital filter blocks, hardwired state machines.) The system can include one or more cameras 158, and/or a display 160 (e.g., a head mounted display).

Various aspects descried herein may be embodied, at least in part, in software. That is, the techniques may be carried out in an audio processing system in response to its processor executing a sequence of instructions contained in a storage medium, such as a non-transitory machine-readable storage medium (for example DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms “renderer”, “processor”, “combiner”, “synthesizer”, “component,” “unit,” “module,” and “logic” are representative of hardware and/or software configured to perform one or more functions. For instance, examples of “hardware” include, but are not limited or restricted to an integrated circuit such as a processor (for example, a digital signal processor, microprocessor, application specific integrated circuit, a micro-controller, etc.). Of course, the hardware may be alternatively implemented as a finite state machine or even combinatorial logic. An example of “software” includes executable code in the form of an application, an applet, a routine or even a series of instructions. As mentioned above, the software may be stored in any type of machine-readable medium.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., extraction of voice and ambience from microphone signals described as being performed at the capture device, or audio and visual processing described as being performed at the playback device) can be performed by a networked server in communication with the capture device and/or the playback device.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system’s registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:

spatially rendering a first sound source to be perceived by a listener at a first position relative to a virtual listener position in a setting that is shown through a display to the listener;

spatially rendering a second sound source to be perceived at a second position relative to the virtual listener position in the setting; and in response to satisfaction of a threshold criterion that includes at least one of: a) a distance between the virtual listener position and the first position, b) a distance between the virtual listener position and the second position, and c) a difference of the distance between the virtual listener position and the second position and the distance between the virtual listener position and the first position, adjusting the spatial rendering of the first sound source so that the first sound source is to be perceived by the listener at a third position relative to the virtual listener position that is closer to the virtual listener position than the first position in the setting.

2. The method of claim 1, wherein the first position is shared with a computer generated avatar in the setting, and wherein the first sound source contains voice captured at a physical location.

3. The method of claim 2, wherein the second position is shared with a virtual display showing a stream of images captured at the physical location, and wherein the second sound source contains ambience captured at the physical location.

4. The method of claim 3, wherein the second sound source contains residual of the voice or the first sound source contains residual of the ambience.

5. The method of claim 1, wherein the first position is shared with a virtual display showing a stream of images captured at a physical location, and wherein the first sound source contains ambience captured at the physical location.

6. The method of claim 1, wherein the second position is shared with a computer generated avatar in the setting, and wherein the second sound source comprises voice captured at a physical location.

7. The method of claim 6, wherein the second sound source contains residual of ambience or the first sound source contains residual of the voice.

8. The method of claim 1, wherein the threshold criterion further includes at least one of: d) an amount of residual of the first sound source contained in the second sound source, e) an amount of residual of the second sound source contained in the first sound source, and f) a loudness of the first sound source or the second sound source.

9. A method, comprising:

spatially rendering a first sound source to be perceived by a listener at a first position relative to a virtual listener position in a setting that is shown through a display to the listener;

spatially rendering a second sound source to be perceived at a second position relative to the virtual listener position in the setting; and in response to satisfaction of a threshold criterion that includes at least one of: a) a distance between the virtual listener position and the first position, b) a distance between the virtual listener position and the second position, and c) a difference of the distance between the virtual listener position and the second position and the distance between the virtual listener position and the first position, applying spatial filters to the second sound source so that the second sound source is to be perceived by the listener after the first sound source is to be perceived by the listener regardless of if the virtual listener position becomes closer to the second sound source.

10. The method of claim 9, wherein the first position is shared with a computer generated avatar in the setting, and wherein the first sound source contains voice captured at a physical location.

11. The method of claim 10, wherein the second position is shared with a virtual display showing a stream of images captured at the physical location, and wherein the second sound source contains ambience captured at the physical location.

12. The method of claim 11, wherein the second sound source contains residual of the voice or the first sound source contains residual of the ambience.

13. The method of claim 9, wherein the first position is shared with a virtual display showing a stream of images captured at a physical location, and wherein the first sound source contains ambience captured at the physical location.

14. The method of claim 9, wherein the second position is shared with a computer generated avatar in the setting, and wherein the second sound source comprises voice captured at a physical location.

15. The method of claim 14, wherein the second sound source contains residual of ambience or the first sound source contains residual of the voice.

16. The method of claim 9, wherein the threshold criterion further includes at least one of: d) an amount of residual of the first sound source contained in the second sound source, e) an amount of residual of the second sound source contained in the first sound source, and f) a loudness of the first sound source or the second sound source.

17. A method, comprising:

spatially rendering a first sound source to be perceived by a listener at a first position relative to a virtual listener position in a setting that is shown through a display to the listener;

spatially rendering a second sound source to be perceived at a second position relative to the virtual listener position in the setting; and in response to satisfaction of a threshold criterion that includes at least one of: a) a distance between the virtual listener position and the first position, b) a distance between the virtual listener position and the second position, and c) a difference of the distance between the virtual listener position and the second position and the distance between the virtual listener position and the first position, moving the first sound source or the second sound source in the setting such that the threshold criterion is no longer satisfied, or preventing a change to the virtual listener position if the change would result in the threshold criterion being satisfied.

18. The method of claim 17, wherein the first position is shared with a computer generated avatar in the setting, and wherein the first sound source contains voice captured at a physical location.

19. The method of claim 18, wherein the second position is shared with a virtual display showing a stream of images captured at the physical location, and wherein the second sound source contains ambience captured at the physical location.

20. The method of claim 19, wherein the second sound source contains residual of the voice or the first sound source contains residual of the ambience.

21. The method of claim 17, wherein the first position is shared with a virtual display showing a stream of images captured at a physical location, and wherein the first sound source contains ambience captured at the physical location.

22. The method of claim 17, wherein the second position is shared with a computer generated avatar in the setting, and wherein the second sound source comprises voice captured at a physical location.

23. The method of claim 22, wherein the second sound source contains residual of ambience or the first sound source contains residual of the voice.

24. The method of claim 17, wherein the threshold criterion further includes at least one of: d) an amount of residual of the first sound source contained in the second sound source, e) an amount of residual of the second sound source contained in the first sound source, and f) a loudness of the first sound source or the second sound source.

* * * * *